June 28, 1932. A. M. GOODLOE 1,865,245
APPARATUS FOR CLEANING AND CHARGING AIR FILTERS
Filed June 22, 1927 4 Sheets-Sheet 1

INVENTOR
Alfred M. Goodloe
BY
his ATTORNEY

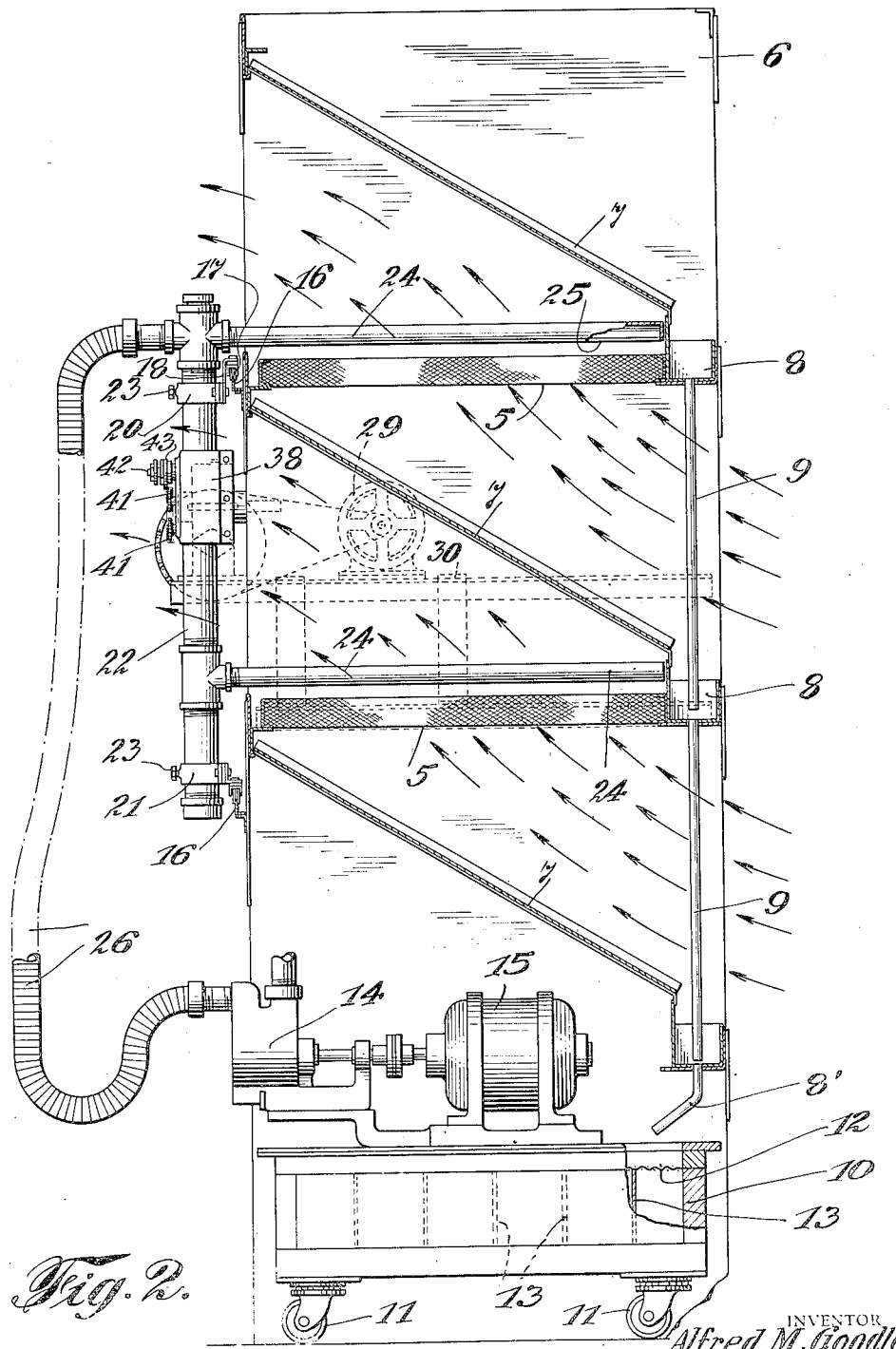

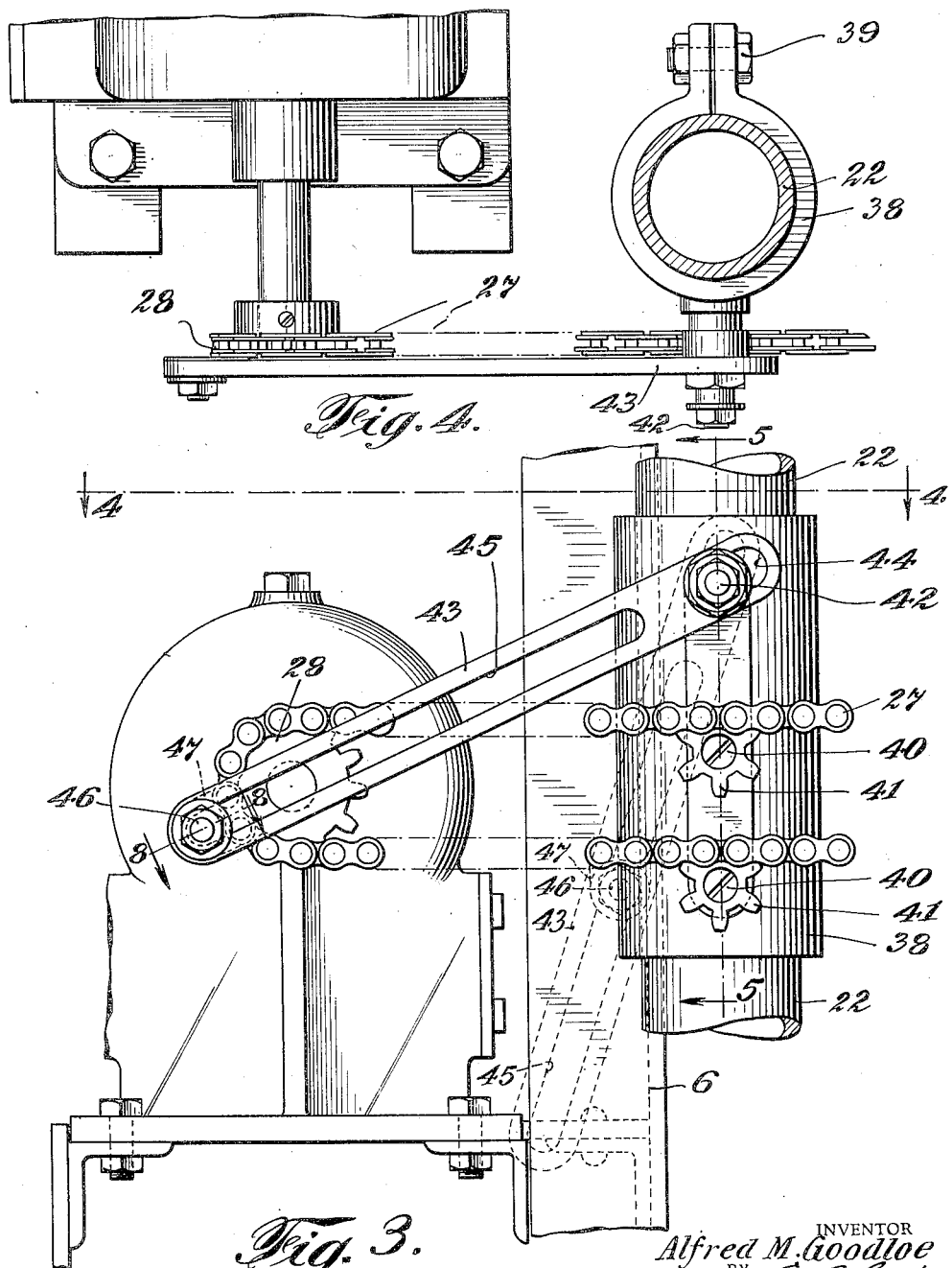

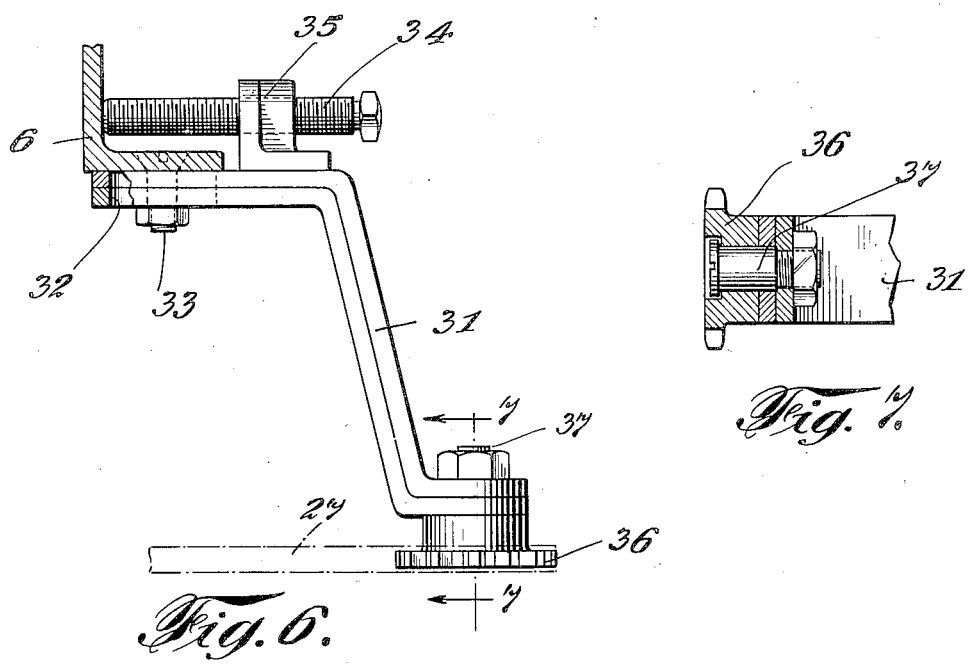
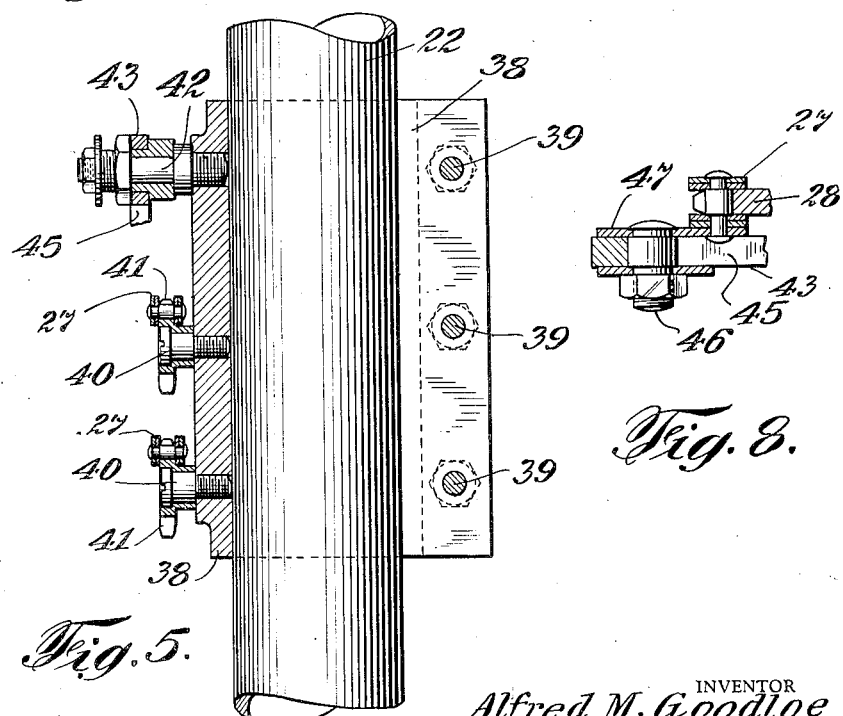

Patented June 28, 1932

1,865,245

UNITED STATES PATENT OFFICE

ALFRED M. GOODLOE, OF BRADFORD, PENNSYLVANIA, ASSIGNOR TO AMERICAN AIR FILTER COMPANY, INC., OF LOUISVILLE, KENTUCKY, A CORPORATION OF DELAWARE

APPARATUS FOR CLEANING AND CHARGING AIR FILTERS

Application filed June 22, 1927. Serial No. 200,555.

This invention relates to apparatus for cleaning and charging air filters, and has for its general object and purpose to provide certain improvements in apparatus of the kind shown in Patent No. 1,577,703, issued March 23, 1926, to John H. Fedeler. This patent discloses a method and means for cleaning filtering medium contained in vertically spaced cells, in situ, or without removing the cells from the filter installation, and then subsequently charging the filter mediums with a viscous solution. It is an important object of my invention to provide a novel mounting and arrangement of the means for delivering the cleaning and charging liquid to the filtering mediums and obtaining an adequate distribution of the liquid over the the entire area of the filter cells.

In the patent above referred to, stationary spray pipes extending longitudinally of the filter cells are employed. One of the important features of my invention is to provide delivery pipes for the cleaning and charging liquid arranged immediately above each filter cell and extending transversely thereof together with means for reciprocating these delivery pipes longitudinally of the filter cells while continuously supplying the liquid under pressure to said pipes.

It is also one of the detail objects of the invention to provide an improved connection between an endless motor-driven element and a supply header connected with the delivery pipes, whereby the rectilinear movement of said header and the delivery pipes is automatically reversed at the opposite ends of its reciprocating movement.

I also propose to provide a movable liquid supply tank preferably carrying the force feed pump and operating motor therefor whereby the same may be readily moved from its operating position with respect to the filter installation to a more convenient location for the purpose of cleaning and repairing.

It is a further general object of my invention to provide apparatus for the above purpose which is comparatively simple in its construction, reliable and efficient in practical operation and which may be manufactured and installed at comparatively small cost.

With the above and other objects in view, the invention consists in the improved cleaning and charging apparatus for air filters, and in the form, construction and relative arrangement of its several parts as will be hereinafter more fully described, illustrated in the accompanying drawings and subsequently incorporated in the subjoined claims.

Referring more particularly to the drawings, wherein I have illustrated one simple and practical embodiment of the apparatus, and in which similar reference characters designate corresponding parts throughout the several views,—

Fig. 2 is a vertical sectional view taken substantially on the line 2—2 of Fig. 1;

Fig. 3 is an enlarged elevation of certain parts of the mechanism;

Fig. 4 is a horizontal section taken substantially on the line 4—4 of Fig. 3;

Fig. 5 is a detail vertical section taken on the line 5—5 of Fig. 3;

Fig. 6 is a detail horizontal section taken on the line 6—6 of Fig. 1;

Fig. 7 is a sectional view taken on the line 7—7 of Fig. 6, and

Fig. 8 is a detail section taken on the line 8—8 of Fig. 3.

Figure 1:
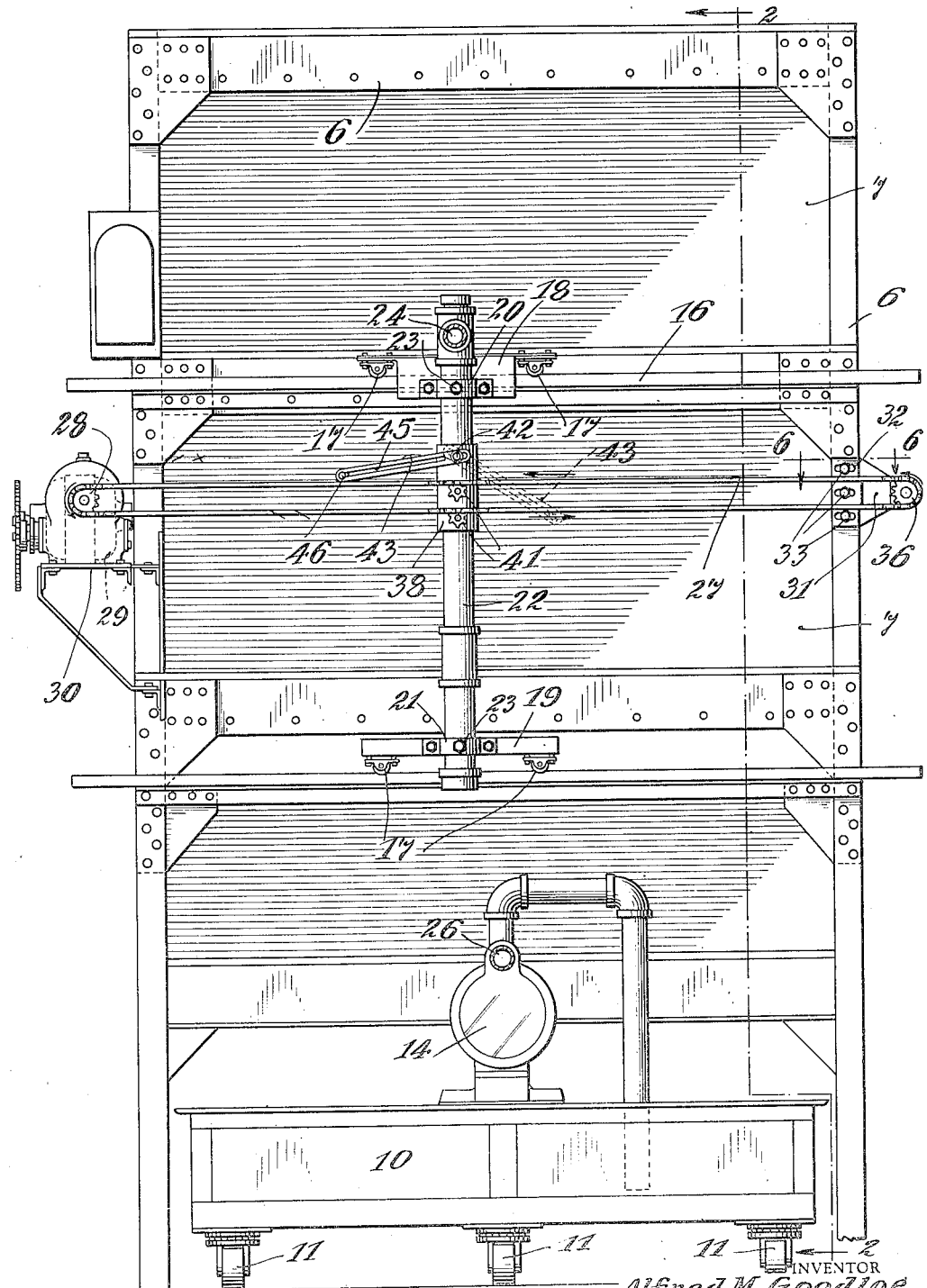
Figure 1 is a front elevation of a filter installation equipped with my improved cleaning and charging mechanism.

For purposes of illustration, in the accompanying drawings, I have shown a multiple arrangement of vertically spaced filter cells in which each of the cells generally indicated at 5 consists of a marginal frame, opposite side sheets of expanded metal, and a suitable filtering medium filling the spaces between these expanded metal sheets, all of which is common construction well known in this art. These cells are arranged in horizontal rows with from two to six cells in each row, and any desired vertically spaced number of such rows of filter cells are rigidly clamped and more or less permanently secured in the metallic frame structure 6. The rows of filter cells thus extend entirely across the passage through which the air to be filtered flows. Below each filter cell and extending across the entire width of the air passage an obliquely inclined metallic apron or plate 7 is arranged, said plates extending upwardly from the ingress to the egress side of the filter and serving to direct the air as indicated by the arrows in Fig. 2 of the drawings, upwardly through the respective filter cells. At their lower edges, these plates or aprons 7 are riveted or otherwise suitably fixed to the walls of the liquid collecting troughs 8 which extend horizontally along each row of filter cells at the ingress side of the filter. A vertically positioned pipe 9 is connected at its upper end with one end of each of the troughs 8 and discharges the contents of said trough into the next lower trough, and from the lowermost collecting trough 8, the liquid is discharged into a suitable collecting and supply tank through the pipe 8'. Each apron or plate 7 is secured at its upper edge at the egress side of the filter to a part of the frame structure 6.

Preferably, the supply tank 10 containing the cleaning and charging liquid is mounted upon supporting rollers or casters 11 so that it may be easily moved from place to place. This tank is preferably of rectangular shape and will vary in size in accordance with the size of the filter installation. A suitable screen indicated at 12 is arranged in the upper part of this tank and a plurality of sediment collecting plates 13 are positioned between said screen and the bottom of the tank whereby the removal of the collected sediment and cleaning of the tank will be greatly facilitated.

A pump 14 and operating motor 15 therefor are preferably mounted upon the tank 10 although if desired, said pump and motor may be arranged in any convenient location on the floor. As shown, said tank together with the pump and the motor may be compactly arranged below the lowermost apron 7 of the filter installation, and when cleaning of the tank or repairs becomes necessary, the said tank may be moved out to any convenient position.

At the egress side of the filter vertically spaced guide rails 16 are suitably secured to the frame structure 6 and upon these rails, the horizontally spaced rollers 17 of the upper and lower carriages 18 and 19 respectively, are positioned. These carriages are provided with collars 20 and 21 respectively, through which the opposite ends of a vertically positioned header pipe 22 are disposed, each of the collars carrying a set screw 23 to secure said pipe against vertical movement.

Branch delivery pipes 24 are connected with the header pipe 22 and extend therefrom transversely over the respective vertically spaced rows of filter cells 5. The lower side of each of these pipes 24 is provided with a slit 25 extending substantially throughout its length and through which the liquid is discharged upon the upper sides of the filter cells.

The pump 14 is connected with the upper end of the header pipe 22 by a flexible hose or conducting tube 26 whereby the cleaning liquid is supplied under pressure from the tank 10 to the delivery pipes 24.

Various mechanical means may be utilized for imparting a reciprocating movement to the header pipe 22 and the delivery pipes 24 so that the liquid will be delivered by the latter pipes in substantially uniform quantity to the filter cells across the entire width of the filter installation. In the accompanying drawings, I have shown one means for accomplishing this purpose which includes an endless chain or other flexible element 27 extending horizontally across the filter installation at its egress side and engaged at one side of the filter with the driving gear 28 of a speed reduction gearing which is connected to the operating motor 29. This motor and the reduction gearing may be conveniently mounted upon a suitable supporting bracket 30 fixed to one side of the frame structure 6. Upon the other side of the frame 6 an angular bracket 31 is mounted, one end of said bracket having a plurality of spaced horizontal slots 32 therein through which bolts 33 mounted in the vertical frame member are positioned, said bolts being provided with suitable clamping nuts whereby the bracket may be rigidly fixed in an adjusted position. Adjustment of said bracket horizontally or laterally with respect to the frame 6 may be conveniently effected by means of the screw 34 threaded in the lug 35 secured to the bracket 31 and bearing at one end against the frame. Upon the other end of this bracket, the sprocket pinion 36 is journalled upon the stud bolt 37 fixed in the bracket and is engaged by the endless chain 27.

A sleeve 38 surrounds the vertical header pipe 22 intermediate of their ends, said sleeve being adjustably clamped to the pipe by means of the bolts 39. Upon suitably formed vertically spaced studs 40 fixed to the sleeve 38, the sprocket pinions 41 are loosely mounted, said pinions respectively engaging the lower sides of the vertically spaced stretches of the endless chain 27.

Above the pinions 41 and in line therewith, a pin 42 is fixed in the sleeve 38 and a draw bar 43 has one of its ends connected with said pin. This end of the draw bar is provided with a short slot 44 to receive said pin permitting of a slight angular shifting movement of the bar with relation to said pin. In addition to this short slot 44, the bar 43 is further provided with the long slot 45 extending for the greater portion of the length of said bar, and this latter slot receives the pin or stud 46 which is carried by the special link element 47 of the endless link chain 27.

From the above description, it will be apparent that as the endless chain 27 is driven in the direction indicated by the arrows in Fig. 1 upon rotation of the driving sprocket 28, the header pipe 22 and the branch delivery pipes 24 will be moved across the filter installation from one side to the other thereof and during this movement the cleaning liquid will be discharged in substantially uniform quantity from each of the delivery pipes over the entire area of the filter cells. When the delivery pipes reach the end of their travel in one direction, they momentarily remain stationary while the pin 46 carried by chain 27 moves around the chain sprockets 28 or 36 as the case may be, and until said pin is positioned at the opposite side of the vertical center line of the header pipe 22. During this movement of the pin 46, as will be seen from a comparison of the full and dotted line positions of the bar 43 in Fig. 3 of the drawings, the said pin moves longitudinally in the slot 45 of the draw bar, said pin moving upwardly in said slot until the pin passes the center line of the header pipe 22, after which said pin moves downwardly or outwardly in the slot 45, it being understood that the draw bar 43 will then assume a reverse angular position to that which it formerly occupied with respect to the pipe 22 and the chain 27. When the pin 46 reaches the end of the slot 45, the other end of said bar will again exert a drawing or pulling pressure on the pin 42, and thereby cause the header pipe and the delivery pipes to be moved in the reverse direction across the filter where the action just described is repeated as the pin 46 moves around the other of the sprockets and to the opposite side of the header pipe 22 when the movement of said pipes will be again reversed. In this manner, a continuous reciprocating motion is imparted to the liquid delivery pipes for the necessary length of time to insure the complete cleaning of the filtering medium. During the first discharge of the liquid through the filter cells, the liquid collects and removes the dirt from the filtering mediums, the dirty liquid being delivered by the inclined aprons 7 into the troughs 8, and being finally discharged from the lowermost trough through the pipe 8' into the tank 10. The greater amount of the dirt in the liquid is collected or caught by the screen 12, and the provision of the plates or baffles 13 prevents turbulence of the liquid discharged from the pipe 8' so that the finer particles of dirt will quickly settle to the bottom of the tank. After the dirt has thus been loosened and washed from the filtering medium contained in the cells, the same liquid used for the purpose of cleaning, such as viscous solution, then forms a coating or film upon the filtering medium. The liquid quickly seeps through the filtering medium and after a short period of time after the discharge of the liquid from the pipes 24 has been stopped, only a thin film of the liquid remains on the surfaces of the filter medium. This film owing to its adhesive nature, collects and retains all dust or dirt which may be present in the air flowing through the filter cells. As above noted, the inclined aprons 7 serve to guide and direct the air upwardly through the filter cells, and the apron above each of the cells against which the filtered air impinges, changes the vertical direction of flow of the air to an approximately horizontal direction.

From the foregoing description considered in connection with the accompanying drawings, the construction, manner of operation and several advantages of my improved air filter cleaning and charging apparatus will be fully understood. It will be seen that I have devised a relatively simple and very efficient apparatus for cleaning air filters in situ, and that during the cleaning and charging operations, it is not necessary to shut down the operation of the filter installation. In so far as I am aware, it is believed to be new in this art to provide the reciprocating liquid discharge pipes continuously delivering the cleaning liquid during their reciprocating movement to a plurality of rows of filter cells. While in the accompanying drawings, I have shown a particular type of filter installation, it will be understood that this is not essential as my present improvements are also capable of application to various other possible filter constructions. Likewise, other means than that herein disclosed may be provided for effecting the reciprocating movement of the liquid delivery pipes. Accordingly, it is to be understood that in practice I reserve the privilege of resorting to all such legitimate variations in the form, proportion and relative arrangement of the several parts of the invention herein described as may be fairly embodied within the spirit and scope of the invention as claimed.

I claim:

1. In combination with an air filter installation having spaced parallel filter cells, means for cleaning the filter cells in situ comprising a cleaning fluid delivery member positioned contiguous to one side of each cell, means for movably supporting said members, fluid supply means connected with said members, and means for moving said members relative to the respective filter cells to deliver the cleaning fluid over the entire area of each cell.

2. In combination with an air filter installation having a horizontally positioned filter cell, means for ceaning the filter cell comprising a cleaning fluid delivery member extending over the filter cell in substantially parallel relation thereto, means for supporting said member for reciprocating movement relative to the filter cell, means for supplying the cleaning fluid to said member, and means for reciprocating said member to effect a delivery of the cleaning fluid upon the filter cell.

3. In combination with an air filter installation having a filter cell, means for cleaning the filter cell comprising a cleaning fluid delivery member positioned contiguous to one side of the filter cell in substantially parallel relation thereto, means for supporting said member for reciprocating movement relative to the filter cell, means for supplying the cleaning fluid to said member, and motor operated means operatively connected with the fluid delivery member to reciprocate the same and effect a delivery of the cleaning fluid upon the filter cell.

4. In combination with an air filter installation having a horizontally positioned filter cell, cleaning means for said filter cell comprising a cleaning fluid delivery member arranged in parallel relation to the filter cell adjacent one side thereof, means supporting said member for reciprocating movement relative to the filter cell, and means for reciprocating said member including a motor driven flexible element, and an operating connection between said flexible element and said member embodying means automatically acting to reverse the direction of movement of said fluid delivery member without interrupting the movement of said endless flexible element.

5. In combination with an air filter installation having vertically spaced horizontally positioned filter cells, means for cleaning said filter cells comprising cleaning fluid delivery members positioned in parallel relation to the respective filter cells adjacent one side thereof, a fluid supply header for said delivery members, means for mounting said header at one side of the filter for reciprocating movement, means for supplying a cleaning fluid to said header, and motor operated means for reciprocating said header and the delivery members to effect a delivery of the cleaning fluid over the entire area of the respective filter cells.

6. In combination with air filter apparatus having vertically spaced horizontally positioned filter cells, means for cleaning the filter cells in situ comprising cleaning fluid delivery members extending transversely over the respective filter cells, a vertically positioned header to which said delivery members are connected, means for supporting said header at one side of the filter for longitudinal reciprocating movement, means for reciprocating said header and the delivery members to effect a delivery of the cleaning fluid over the entire area of the respective filter cells.

7. In combination with air filter apparatus having vertically spaced horizontally positioned filter cells, means for cleaning and charging the filter mediums in said cells comprising delivery pipes for a cleaning and charging liquid positioned over the respective filter cells in substantially parallel relation thereto, a supply header with which said pipes are connected, means for supporting said supply header at one side of the filter for reciprocating movement, a liquid supply tank, means connected with said header for supplying the liquid under pressure thereto from the tank, means for reciprocating said header and the delivery pipes to effect a delivery of the cleaning and charging liquid upon the filter cells over the entire area thereof, and means for collecting and returning the cleaning and charging liquid draining from the filter cells to said supply tank.

8. In an air filter, a filter member, a movable spraying device located above said filter member, a tank for containing a cleaning fluid, means for pumping cleaning fluid from said tank to said spraying device, and means for moving said spraying device back and forth above said filter member.

9. In a filter device, an air filter, means for passing air therethrough, a spraying device for passing a cleaning fluid downwardly through said air filter, and means for moving said spraying device back and forth above said air filter.

10. In a filter device, an air filter, means for passing air therethrough, a spraying device for passing a cleaning fluid downwardly through said air filter, and means for changing the position of the spray by moving the spraying device above said filter.

11. In a filter device, a plurality of filters set therein and located one above the other, means for passing a cleaning fluid through said filters, troughs associated with the respective filters, means for conducting the cleaning fluid from said filters to said troughs, and means for conducting said fluid from said troughs back to said filters.

12. In a filter device, a filter, means for conducting air through said filter, a tank provided with a filter member, and means for circulating a fluid through said filter comprising connections for passing the fluid through said filter member into the tank and from thence to the upper side of said filter.

In testimony that I claim the foregoing as my invention, I have signed my name hereto.

ALFRED M. GOODLOE.